Figure 1:
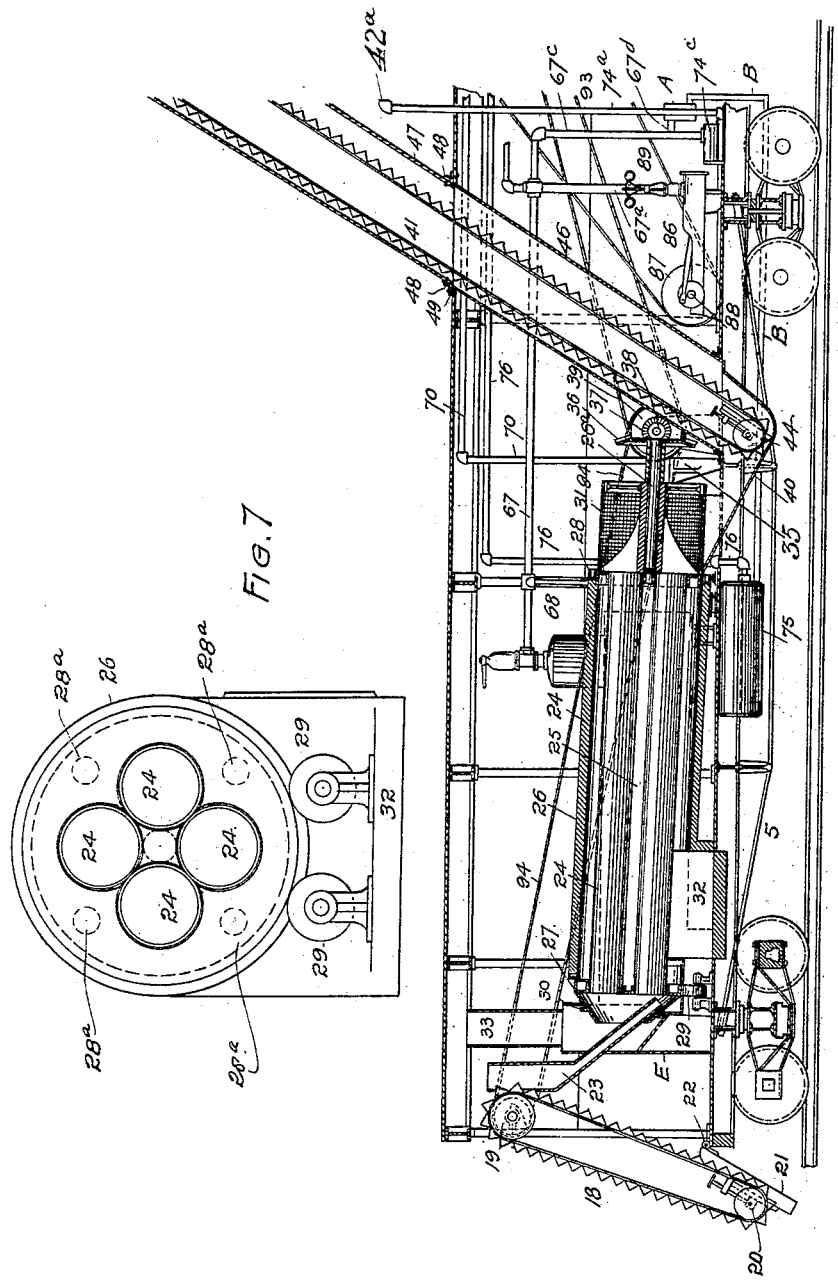

No. 620,555. Patented Feb. 28, 1899.
J. A. McINTYRE.
PORTABLE ASPHALT PLANT.
(Application filed Jan. 3, 1898.)
(No Model.) 4 Sheets—Sheet 1.

No. 620,555. Patented Feb. 28, 1899.
J. A. McINTYRE.
PORTABLE ASPHALT PLANT.
(Application filed Jan. 3, 1898.)
(No Model.) 4 Sheets—Sheet 3.

Witnesses
Inventor
J. A. Mc. Intyre.
By his Attorney

No. 620,555. Patented Feb. 28, 1899.
J. A. McINTYRE.
PORTABLE ASPHALT PLANT.
(Application filed Jan. 3, 1898.)
(No Model.) 4 Sheets—Sheet 4.

Witnesses
Inventor
J. A. McIntyre.
By his Attorney

UNITED STATES PATENT OFFICE.

JOHN A. McINTYRE, OF DENVER, COLORADO.

PORTABLE ASPHALT PLANT.

SPECIFICATION forming part of Letters Patent No. 620,555, dated February 28, 1899.

Application filed January 3, 1898. Serial No. 665,368. (No model.)

*To all whom it may concern:*

Be it known that I, JOHN A. MCINTYRE, a citizen of the United States of America, residing at Denver, in the county of Arapahoe and State of Colorado, have invented certain new and useful Improvements in Portable Asphalt Plants; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a portable asphalt plant, my object being to provide a plant having all the necessary apparatus for preparing the paving material know as "asphaltum," which plant may be readily moved from place to place. Heretofore, so far as I am aware, only stationary plants for this purpose have been employed. These of course are capable of use only in one location, and unless the work to be done is of considerable mangnitude the contractor cannot afford to erect a plant. My portable plant is designed to overcome this difficulty, since its use is not confined to any particular locality. Moreover, the time consumed in getting ready to move my improved plant and putting it in shape for use after moving is inconsiderable.

In my portable plant the sand-drying apparatus, the fire-box for supplying heat, and the boiler are mounted on one car, and the melting kettles or retorts on another car. When the plant is in use, the mixer or the apparatus for mixing the sand with the asphalt is located between the two cars, being mounted on a track connecting the cars, which are separated sufficiently for the purpose. When preparing to move from one locality to another, the mixer is moved into one of the cars and one extremity of the track disconnected, after which the track is swung around against the end of the car. The two cars are then pushed together and coupled in the usual manner. The sides of the cars are divided longitudinally about midway of their height, and the sections are respectively hinged to the top and bottom of the car. One of these sections is raised to form a roof and the other lowered to form a platform for the workmen. The mixer when in use is elevated sufficiently between the cars to allow wagons to pass beneath for receiving the prepared material. The melted asphalt is raised from the kettles to the mixer by air-pressure. The elevators employed in handling the sand are adjustable, whereby they may be inclosed within the car during transportation and readily brought into position for use when the plant has reached its destination.

Having thus briefly outlined some of the important features of my invention, I will proceed to describe the same more in detail, reference being made to the accompanying drawings, in which is illustrated an embodiment thereof.

Figure 2:
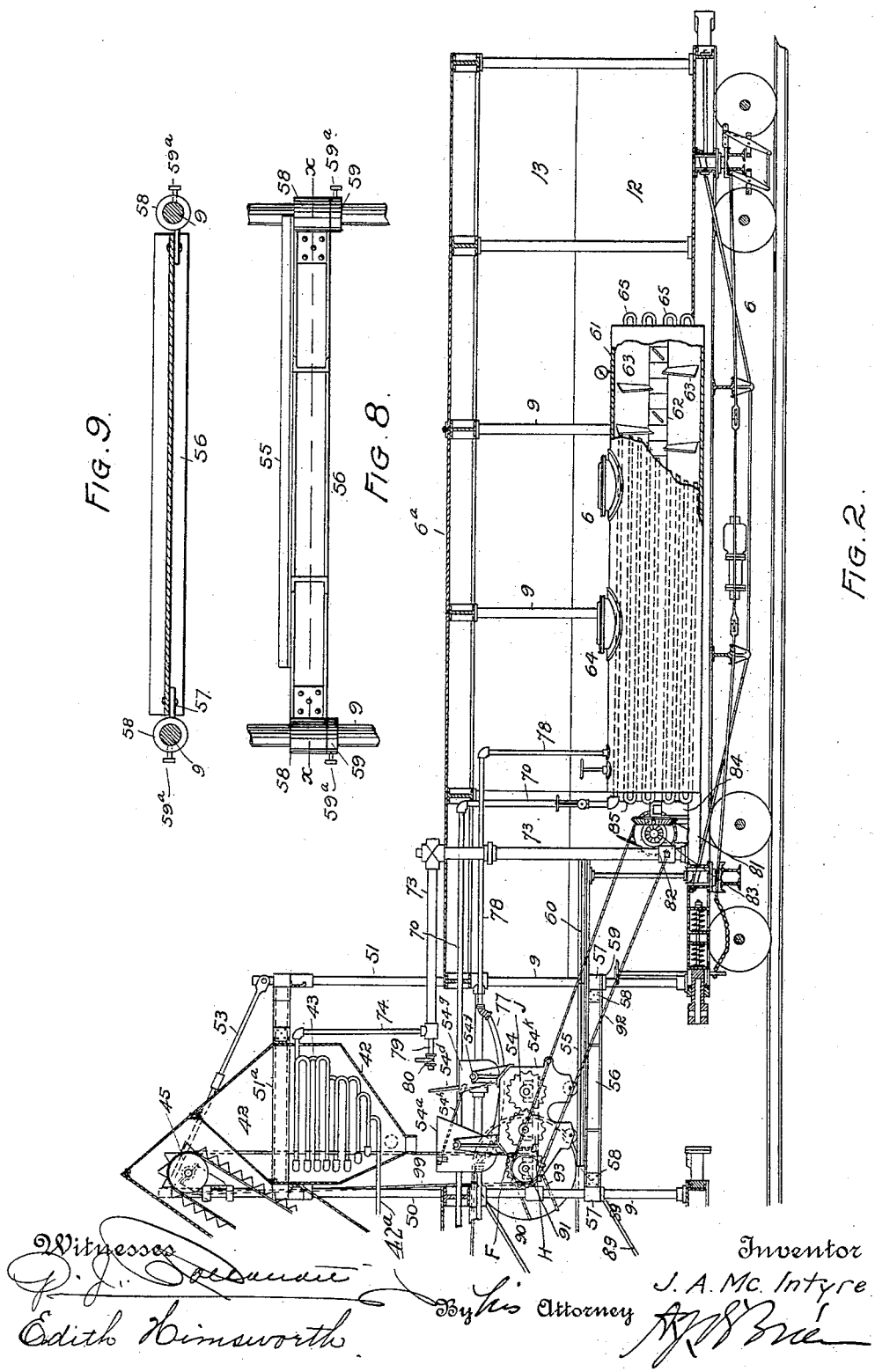
Figure 3:
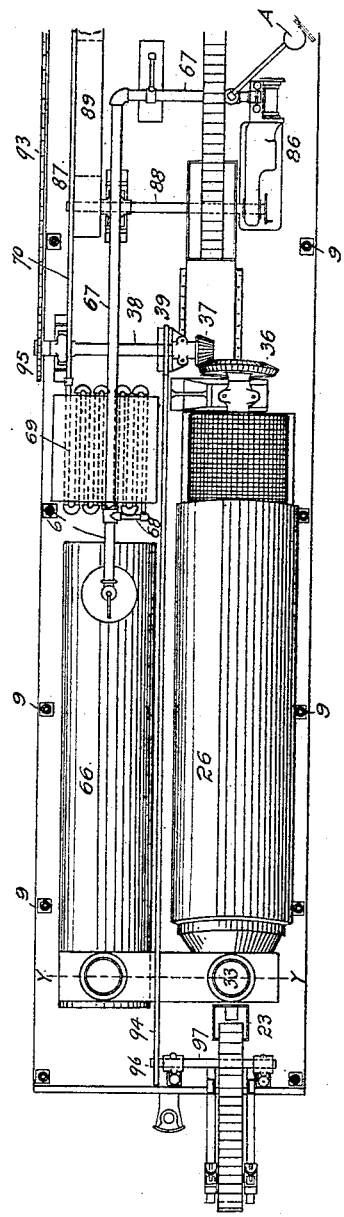
Figure 4:
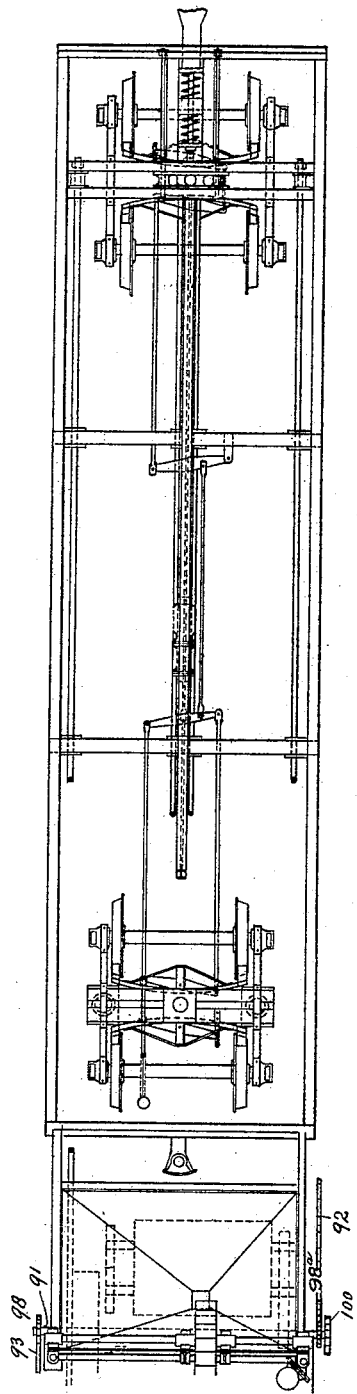
Figures 5, 6:
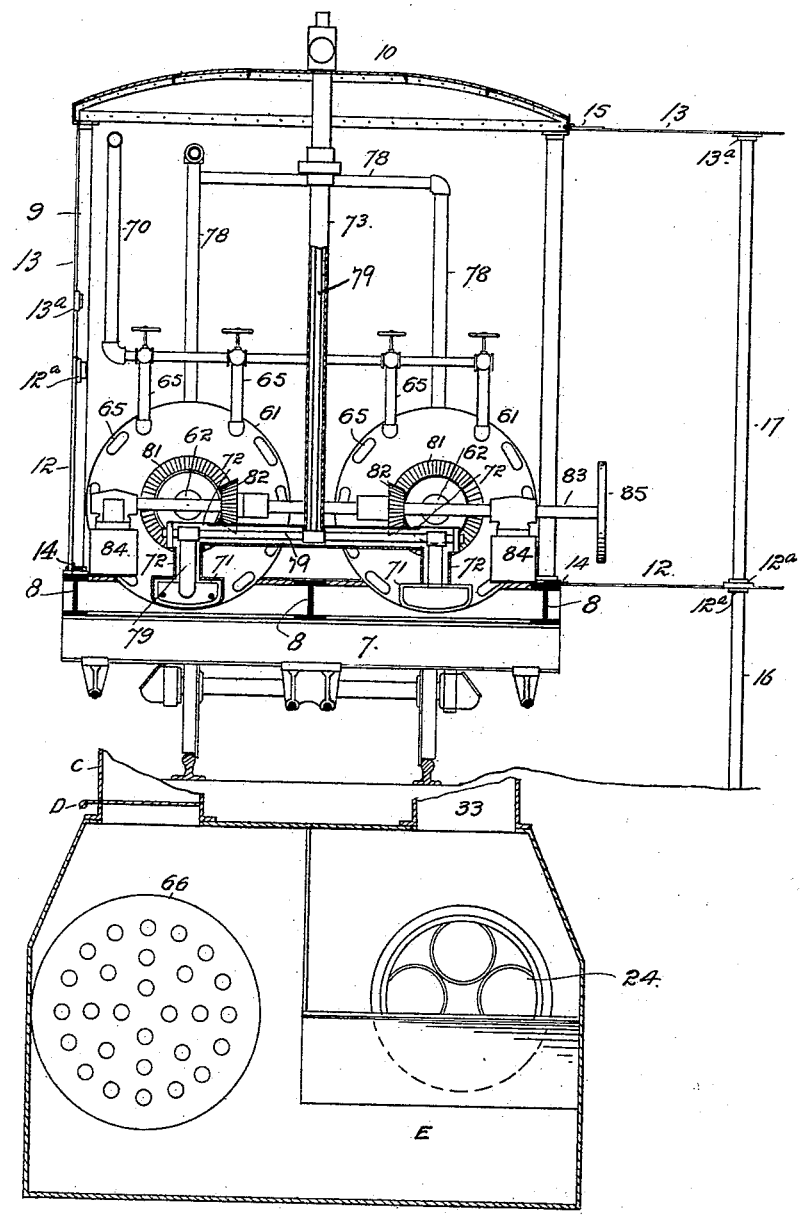

In the drawings, Figures 1 and 2 form together the side view of the apparatus in position for use. In these views the cars are shown in vertical section and the inclosed mechanism partly in section. Two views are employed to show the entire plant for the reason that a single sheet is not long enough to show the same in a single view and on a proper scale. Fig. 3 is a plan view of the mechanism shown in Fig. 1, the roof of the car being removed and the columns shown in section. Fig. 4 is a plan view of the car shown in Fig. 2, the mixer being shown in place at the extreme left, the other mechanism being removed to show the underneath structure of the car. Fig. 5 is an end view of the car, carrying the melting-kettles. Fig. 6 is a section taken on the line $y\ y$, Fig. 3. Fig. 7 is a front view of the sand-drying apparatus shown in detail and on a larger scale. Fig. 8 is a side detail view of the adjustable track for supporting the mixer between the cars. Fig. 9 is a section taken through one side of the track and its supporting-columns on the line $x\ x$, Fig. 8.

Similar reference characters indicating corresponding parts in these views let the numerals 5 and 6 designate the two cars forming a part of my portable plant and upon which the apparatus for handling, preparing, and mixing the materials is constructed. These cars are suitably equipped with trucks, brake mechanism, and draw-bars for coupling. The bottom framework of the cars is composed of transverse I-beams 7 and longitudinal I-beams 8, resting thereon. Upon this bottom framework or foundation is erected the framework of the superstructure, consisting of vertical columns 9, which support the roof 10. The side walls of each car consist of two sections 12 and 13, respectively. The section 12 is hinged to the bottom of the car, as shown at 14, while the section 13 is hinged to the roof of the car, as shown at 15. These two sections of the car side are open when the plant is in use, the one being lowered and the other raised. (See right-hand side of Fig. 5.) The section 12 is supported by a column 16, resting on the ground or other suitable foundation, while the section 13 is supported by a column 17, resting on the section 12 and directly above the column 16. The sections 12 and 13 are provided with sockets $12^a$ and $13^a$, respectively, to receive the column extremities. Only a single column of each kind is shown in the drawings. It must be understood that a number of columns of each class will be required. The sections 12 when lowered form a platform for the workmen, while the sections 13 form a roof to shield them from sun and storm.

Referring now to the apparatus mounted on the car 5, an elevator 18 is located at the extreme left-hand end of the car. This elevator is composed of a flexible belt, upon which are mounted suitable cups or buckets. Its extremities engage drums 19 and 20. The lower drum 20 is supported by a bar 21, hinged to the car at 22. When not in use, the drum 20 and its attachments may be placed in the car by turning the bar 21 upwardly upon its hinge. The sand employed is fed to this elevator and carried thereby to the chute 23, whence it passes to the drying apparatus, which consists of a number of drums 24, connected by two heads 27 and 28. The front head 27 is closed, except where the drum extremities enter. The rear head 28 is provided with openings $28^a$ to allow the heat to pass through the head and return through the drums 24, where it is brought in contact with the sand. The dotted circles in Fig. 7 indicate the openings $28^a$ in the rear head 28. The front head 27 of the sand-drying apparatus engages wheels 29, mounted on the bottom of the car. The head 27 has a conical extension 30, into which the sand is directly discharged by the chute 23. As the drums 24 are rotated each drum catches a portion of the sand and carries it toward the screen 31, attached to the opposite head 28. The drums 24 are suitably inclined from the receiving end 30 downwardly to the screen 31. The heat for drying the sand is generated in a fire-box 32 and passes directly upwardly around the drums 24, and thence toward their rear extremities, which being open allow the heat after passing through the openings $28^a$ of the head to pass backward through the drums, where it is brought in direct contact with the sand. The gases and products of combustion pass thence through the conical extension or mouth 30 to the smoke-stack 33. As shown in the drawings, (see Fig. 7,) four drums 24 are employed. It is evident, however, that any other desired number may be used. To the rear head 28 is attached a short shaft $26^a$, which is journaled in a suitable support 35, mounted on the bottom of the car. To the rear extremity of this shaft is made fast a bevel gear-wheel 36, which meshes with a gear 37, fast on a shaft 38. This shaft is also provided with a sprocket-wheel 39. The drums 24 are surrounded by a stationary fire-brick casing 26, which is open immediately above the fire-box 32 to allow the heat to pass to the drums. The central space between the drums is designated by the numeral 25.

The sand which passes through the screen 31 falls into a receptacle 40, whence it is taken by the elevator 41 and discharged into a hopper 42, containing a pipe-coil 43. This elevator consists of a flexible belt carrying buckets, the belt passing around suitable end drums 44 and 45. This elevator is inclosed by a housing composed of the parts 46 and 47. The part 46 is sufficiently large to allow the part 47 to slip downward thereinto when the part 47 is detached from the top of the car, where it is suitably secured by means of bolts 48, passing through angle-plates 49, made fast to the top of the car. The drum 45 is journaled in the upper extremity of this housing 47 and passes downward therewith. The hopper 42 is located between the two cars 5 and 6 and above the roofs. It is mounted on columns 50 and 51, whose lower extremities engage the respective cars at points directly above the end columns 9 of the cars. The upper extremities of the columns 50 and 51 are connected by a tie-rod 53, which spans the space between the two cars. The columns 50 51 are further connected by bars $51^a$, one only being shown. The entire hopper-supporting framework is readily detachable for purposes of transportation. While moving from place to place this hopper apparatus is stored in the car 6, the roof of which is provided with a hinged door $6^a$ to allow the hopper to pass bodily therethrough.

Below the discharge-mouth of the hopper 42 is located the mixer 54, which is mounted on wheels engaging a track which spans the space between the cars 5 and 6. This track is composed of rails 55, attached to beams 56. The extremities of each beam are bolted to projections 57, formed on sleeves 58, surrounding the columns 9 and engaging the vertically-adjustable collars 59, which are secured to the columns by set-screws $59^a$. The sleeves 58 are loose on the columns. Located within the adjacent end of the car 6 and in line with the rails 55 is a stationary track-section 60, upon which the mixer rests when not in use and during transportation. When the mixer is run upon the track-section 60, the beams 56 are unbolted at one end and swung around against the end of the opposite car to permit the cars to be coupled in the ordinary manner.

Upon the car 6 are mounted the kettles or retorts 61 for mixing the asphalt. Each of these kettles is cylindrical in form and provided with a central shaft 62, to which are attached agitating-arms 63. They are provided at the top with manholes 64 for receiving the material to be treated. Outside of the agitators are located the pipes 65, through which passes the superheated steam for melting the asphalt.

The steam for operating the entire plant is generated in a boiler 66, mounted on the car 5. The steam passes from the boiler by way of a pipe 67, and thence by way of a branch pipe 68 to the superheater 69, thence through a pipe 70, which passes from one car to the other, and thence to the pipes 65 of the kettles or retorts 61. The steam after circulating through the pipes 65 of the kettles exhausts into the chambers 71, attached to the kettle ends. From these chambers the steam passes to a conduit 72, and thence through pipes 73 and 74 to the coils 43 in the hopper 42, and thence through a pipe $74^a$ to the boiler-pump $74^c$. The melted asphalt is forced out of the kettles and thence upwardly to a point above the mixer by air from a receiver 75, mounted underneath the car 5. The air from this receiver passes first into a pipe 76, and thence through a flexible coupling 77 between the cars to a pipe 78, and thence into the tops of the kettles. The air-pressure thus introduced to the kettles forces the molten asphalt out through the pipes 79, which enter the chamber 71. These pipes 79 pass thence through the exhaust-steam pipes 72 and 73, finally terminating at a point between the cars and sufficiently elevated to discharge into the mixer. At this extremity the pipe 79 is provided with a valve 80, which controls the discharge of the asphalt to the hopper $54^g$, which is trunnioned on a suitable support, as shown at $54^j$. The sand from the hopper 42 falls into a hopper $54^a$, trunnioned on a suitable support, as shown at $54^c$. Both hoppers $54^a$ and $54^g$ are nicely balanced, so that they may be easily tipped for the purpose of discharging their contents into the mixing-chamber $54^k$. The mechanism located within this chamber for mixing the sand and asphalt is of ordinary construction, and therefore needs no description in detail. The sand-hopper is tipped through the instrumentality of a lever $54^d$ and a link $54^h$, connecting the hopper and lever.

The shaft 62 of each melting-kettle protrudes from the end of the kettle and is provided with a bevel-gear 81, which meshes with a gear 82, fast on a shaft 83, journaled in a suitable support 84, mounted on the car. A sprocket-wheel 85 is also made fast on the shaft 83 for the purpose of transmitting motion to said shaft, as hereinafter described.

The engine for operating the working parts of the machinery is mounted on the car 5 and designated by the numeral 86. From a pulley 87, fast on the engine-shaft 88, leads a belt 89 to a pulley 90, fast on a shaft 91, journaled in the framework of the mixer. From a sprocket-wheel $98^a$, fast on the shaft 91, leads a chain 92 to the sprocket-wheel 85 on the shaft 83. From another sprocket-wheel 98 on the shaft 91 leads a chain 93 to a sprocket-wheel 95 on the shaft 38. From a sprocket-wheel 39 on the shaft 38 leads a chain 94 to a sprocket-wheel 96, fast on the shaft 97, which carries the elevator-drum 19. From a sprocket 100 on the shaft 91 leads a chain 99 to a sprocket (not shown) on the shaft $45^a$, carrying the elevator-drum 45. The steam for operating the engine 86 passes thereto through a pipe $67^a$, connected with the steam-pipe 67. The steam for operating the boiler-pump $74^c$ passes thereto through a pipe $67^c$, connected with the main steam-pipe 67. The steam for operating the air-pump A is taken from the pipe 67 by way of a branch pipe $67^d$. The receiver 75 is connected with the air-pump A by a pipe B. Above the boiler 66 is located a smoke-stack C, which is provided with a cut-off slide D. When this slide is closed, the gases from the boiler-furnace are compelled to pass through the furnace or fire-box 42 of the drying apparatus by way of a conduit $42^a$, whereby the loss of fuel by imperfect combustion is reduced to a minimum.

The operation of the plant will now be briefly and connectedly described. Motion is transmitted from the engine-pulley 87 to the pulley 90 on the shaft 91 by means of the belt 89, and thence to the mixer 45, through the instrumentality of the gears F, H, and J. From the sprocket-wheel $98^a$ on the shaft 91 motion is transmitted to the sprocket 85 on the shaft 83 by means of a chain 92, and thence to the shafts 62 of the melting-kettles by the gears 81 and 82. From the shaft 91 motion is also transmitted to the elevator 41 by means of a chain 99, engaging a sprocket-wheel (not shown) on the shaft of the drum 45. From the shaft 91 motion is also transmitted to the shaft 38 by means of a chain 93 engaging sprocket-wheels 98 and 95, fast on the respective shafts. The drums 24 are rotated through the medium of the meshing gears 36 and 37. From the shaft 38 motion is communicated to the elevator 18 by means of a chain 94, engaging a sprocket 39 on the shaft 38, and a sprocket 96 on the shaft 97 of the elevator-drum 19. When the mechanism is in operation, the sand is fed to the elevator 18 and discharged thereby into the chute 23, whence it passes to the drums 24, by which it is carried to the screen 31, from which it falls into the receptacle 40, whence it is carried by the elevator 41 to the hopper 42, from which it falls into the hopper $54^a$ of the mixer. The asphalt from the melting-kettles is discharged into the hopper $54^g$ from the pipe 79. The hot sand and molten asphalt are then tipped into the mixer in suitable proportions. The mixed material is subsequently discharged from the mixer into the wagons driven underneath the mixer and between the two cars 5 and 6. The asphalt is kept at a proper temperature while passing through the pipe 79 by the exhaust-steam passing through the pipe 73, which forms a steam-jacket around the pipe 79. The sand is heated to the proper temperature in the hopper 42 by the steam passing through the coils 43.

Having thus described my invention, what I claim is—

1. The combination of a suitable apparatus for mixing sand and asphaltum for paving and other purposes, two cars upon which the said apparatus is mounted, an intermediate track connecting the two cars, said track comprising rails and beams upon which the rails are mounted, the beams being detachably connected with one car and hinged to the other car, whereby they are adapted to swing horizontally when one extremity of each is detached, and another section of track located in one of the cars adjacent the intermediate track upon which the mixer may be placed when not in use.

2. In a portable asphalt plant, the combination of suitable apparatus for preparing and mixing the sand and asphalt, of two cars upon which the said apparatus is mounted, two upright columns mounted on one extremity of each car, a loose sleeve mounted on each column, vertically-adjustable collars mounted on the columns and forming the support for the sleeves, beams to which are attached the track-rails upon which the mixer is mounted, the two corresponding extremities of the beams being secured to the sleeves on the columns of one car, while their opposite extremities are detachably connected with the sleeves of the other car.

3. In a portable asphalt plant, the combination with a car upon which the sand-drying apparatus is mounted, of an elevator mounted on the car and adapted to receive the sand from the drying apparatus, and a two-part housing inclosing said elevator, one part of the housing being detachably mounted on the top of the car, the parts of the housing being so constructed that when the upper portion is detached, the one part will telescope within the other part.

In testimony whereof I affix my signature in presence of two witnesses.

JOHN A. McINTYRE.

Witnesses:
G. J. ROLLANDET,
EDITH HIMSWORTH.